(12) United States Patent
Shenoi

(10) Patent No.: US 7,161,953 B2
(45) Date of Patent: Jan. 9, 2007

(54) BONDING MULTIPLE G.SHDSL LINKS

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 1008 days.

(21) Appl. No.: 10/156,217

(22) Filed: May 28, 2002

(65) Prior Publication Data
US 2003/0123476 A1 Jul. 3, 2003

Related U.S. Application Data

(60) Provisional application No. 60/317,353, filed on Sep. 5, 2001, provisional application No. 60/322,608, filed on Sep. 17, 2001.

(51) Int. Cl.
*H04J 3/16* (2006.01)

(52) U.S. Cl. .................. 370/465; 370/468; 370/352

(58) Field of Classification Search ............... None
See application file for complete search history.

(56) References Cited

U.S. PATENT DOCUMENTS

| | | | |
|---|---|---|---|
| 5,878,041 A * | 3/1999 | Yamanaka et al. ..... | 370/395.65 |
| 6,690,718 B1 * | 2/2004 | Kim ..................... | 375/222 |
| 6,751,254 B1 * | 6/2004 | Palm ..................... | 375/222 |
| 2002/0167949 A1 * | 11/2002 | Bremer et al. .......... | 370/395.1 |
| 2003/0086486 A1 * | 5/2003 | Graziano et al. ........ | 375/222 |
| 2003/0123487 A1 * | 7/2003 | Blackwell et al. ....... | 370/485 |
| 2005/0281268 A1 * | 12/2005 | Akers et al. ............ | 370/395.1 |

OTHER PUBLICATIONS

"Symmetricon Extends Broadband Market Focus With Preview of New GoWide Integrated Access Device" as acquired from http://www.symmetricom.com/new/060501_01.html.

* cited by examiner

*Primary Examiner*—Phirin Sam
(74) *Attorney, Agent, or Firm*—John Bruckner PC

(57) ABSTRACT

Systems and methods are described for bonding multiple G.shdsl links. A method includes transporting digital data including: coupling a first end of a plurality of unbundled network elements to a first modem; coupling a second end of the plurality of unbundled network elements to a second modem; applying a single signal to the first modem; time division multiplexing the single signal into a plurality of signals at the first modem; transmitting the plurality of signals to the second modem over the plurality of unbundled network elements; receiving the plurality of signals at the second modem; and time division demultiplexing the plurality of signals to combine the plurality of signals into a single synchronous signal at the second modem. Each of the plurality of unbundled network elements includes a G.shdsl link.

37 Claims, 7 Drawing Sheets

BONDING MULTIPLE G.SHDSL LINKS

CROSS-REFERENCES TO RELATED APPLICATIONS

This application is related to, and claims a benefit of priority under 35 U.S.C. 119(e) from, copending U.S. Ser. No. 60/317,353, filed Sep. 5, 2001; copending U.S. Ser. No. 60/322,608, filed Sep. 17, 2001; and the entire contents of all of which are hereby expressly incorporated by reference for all purposes.

BACKGROUND OF THE INVENTION

1. Field of the Invention

The invention relates generally to the field of communication networks. More particularly, the invention relates to transporting digital data over subscriber loops. Specifically, the invention relates to transporting legacy traffic over multiple G.shdsl links.

2. Discussion of the Related Art

G.shdsl represents an international standard for transporting digital data over subscriber loops. The G.shdsl standard is established by the ITU-T as G.991.2. It provides a method for transporting a full-duplex bit-stream of up to 2.3 Mbps over short loops. The standard provides for operation that is rate-adaptive in nature, supporting payload rates ranging from 2.3 Mbps over 6 kft (26-AWG) loops to 192 kbps over loops as long as 18 kft (again, 26-AWG). A T1 rate (1.544 Mbps) can be supported over loops as long as 9 kft (26-AWG). This data distance profile (DDP) takes into consideration very high levels of cross-talk from adjacent loops in the same binder group. In conditions of low-noise, the capacity is much greater.

The encoding method specified for G.shdsl, known as trellis-coded pulse amplitude modulation ("TC-PAM"), is well suited for combating interference while being spectrally friendly with respect to other services carried over loops in the same binder group. The reach at a given data rate is longer when there is less interference. Several chip manufacturers provide proprietary extensions of the G.shdsl standard for improving the DDP.

There are numerous situations where a digital bit-stream needs to be delivered between a location, such as a cellular base-station or remote access multiplexer, and a central office. The bit-stream is usually a DS1 ("T1"; 1.544 Mbps) or DS3 ("T3"; 44.736 Mbps). More often than not, the DS1 is a framed signal, with a payload of 1.536 Mbps organized as a collection of DS0s; the DS3 is usually formatted with ATM cells and is "partially" full, corresponding to a data rate utilization of about 10 to 15 Mbps (filler ATM cells and DS3-specific overhead bring the rate up to 44.736 Mbps).

Referring to FIG. 1, a bock diagram of a DS3 backhaul application scenario is depicted. FIG. 1 depicts a situation where a competitive local exchange carrier (CLEC) has deployed a remote digital subscriber line access multiplexer (DSLAM) 110 for serving subscribers at a distance from the central office (CO). The CLEC would most likely deploy other equipment, such as DSLAMs and aggregation devices in the CO, renting space from the incumbent local exchange carrier (ILEC) in what is called a collocation arrangement (COLO). A plurality of subscriber DSL lines 100 is coupled to a remote DSLAM 110. The remote DSLAM 110 is coupled to a DS3 line 130 in a DS3 facility 131 via a DS3 connection 120. The DS3 line 130 is one of a plurality of lines 140. The plurality of lines 140 is coupled to an aggregation device 150.

The network side interface of the remote DSLAM 110 is a DS3 formatted stream of ATM cells, and, depending on the services provided and number of subscribers served, is most likely to be only partially occupied ("fractional-DS3"). However, the CLEC 160 must lease a complete DS3 line 130 from the ILEC to interconnect the remote DSLAM 110 to COLO-based aggregation equipment. The cost to the CLEC 160 for the leased DS3 line 130 can be quite high, depending on distance and market (geographic location). The business constraint of having to lease a complete DS3 line for a fractional application represents a problem (inefficiency) for the CLEC. What is needed is an approach that is less costly for the CLEC.

Another problem with this technology has been that, generally speaking, the capacity of a loop, measured in terms of bit-rate, decreases as the loop length increases. It is not uncommon for the required capacity (demand) to exceed the carrying capacity. For example, in the case of DS1 backhaul, the objective is to transport 1.544 Mbps (or 1.536 Mbps) over the loop. If the length of the loop is 15 kft (26 AWG), then such loop is incapable of achieving this objective since the length limits the rate to 192 kbps discussed above.

One unsatisfactory approach in an attempt to solve the above-discussed capacity problem involves deploying repeaters. The G.shdsl standard explicitly describes repeater operation. However, repeaters can be expensive, and their installation is not always feasible depending on geography and power requirements. What is needed is a solution that meets the above-discussed requirements in a more cost-effective manner.

Heretofore, the requirements for transporting legacy traffic over multiple G.shdsl links on long loops in a cost-effective and practical manner have not been fully met. What is needed is a solution that addresses these requirements.

SUMMARY OF THE INVENTION

There is a need for the following embodiments. Of course, the invention is not limited to these embodiments.

According to an aspect of the invention, a method comprises transporting digital data including: coupling a first end of a plurality of unbundled network elements to a first modem; coupling a second end of the plurality of unbundled network elements to a second modem; applying a single signal to the first modem; time division multiplexing the single signal into a plurality of signals at the first modem; transmitting the plurality of signals to the second modem over the plurality of unbundled network elements; receiving the plurality of signals at the second modem; and time division demultiplexing the plurality of signals to combine the plurality of signals into a single synchronous signal at the second modem, wherein each of the plurality of unbundled network elements includes a G.shdsl link. According to another aspect of the invention, a method comprises: applying a single signal to a first modem; time division multiplexing the single signal into a plurality of signals at the first modem; and transmitting the plurality of signals from the first modem to a second modem over a plurality of unbundled network elements, wherein each of the unbundled network elements includes a G.shdsl link. According to another aspect of the invention, a method comprises: receiving a plurality of signals at a modem from a plurality of unbundled network elements; and time division demultiplexing the plurality of signals to combine the plurality of signals into a single synchronous signal at the modem, wherein each of the plurality of unbundled network elements includes a G.shdsl link. According to another aspect of the invention, an apparatus comprises: a DS1 receive circuitry coupled to a data connection; a DPR module coupled to the DS1 receive circuitry; a ROM coupled to the DPR module; and a plurality of G.shdsl transceivers coupled to the DPR module.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Within this application several publications are referenced by Arabic numerals within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent Applications disclose embodiments that are satisfactory for the purposes for which they are intended. The entire contents of U.S. Patent Applications: U.S. Ser. No. 60/344,542, filed Nov. 7, 2001; and U.S. Ser. No. 60/358,549, filed Feb. 21, 2002 are both hereby expressly incorporated by reference herein for all purposes.

The context of the invention can include communications networks the context of the invention can also include transport of digital data over subscriber loops and ATM networks. The context of the invention can also include transporting legacy traffic over multiple G.shdsl links.

The invention can include providing a method and/or apparatus to deploy additional loops by bonding multiple loops (two or more) to obtain an aggregate bit-rate, that is, nominally, the sum of the capacities of the individual loops. In particular, if two loops are deployed, the G.shdsl standard describes how these two loops can be bonded together to provide a channel bit-rate which is twice the capacity of a single loop.

Figure 1:
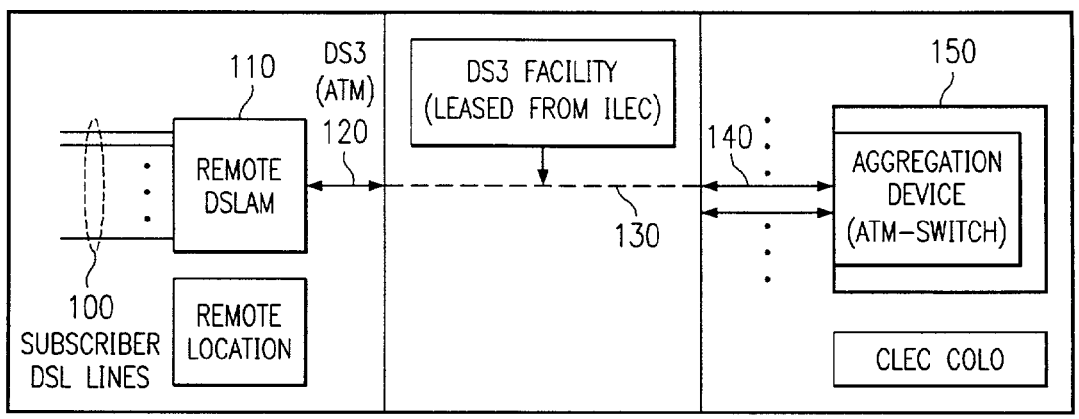
FIG. 1 illustrates a block diagram of a DS3 backhaul application scenario, appropriately labeled "Prior Art."
Figure 2:
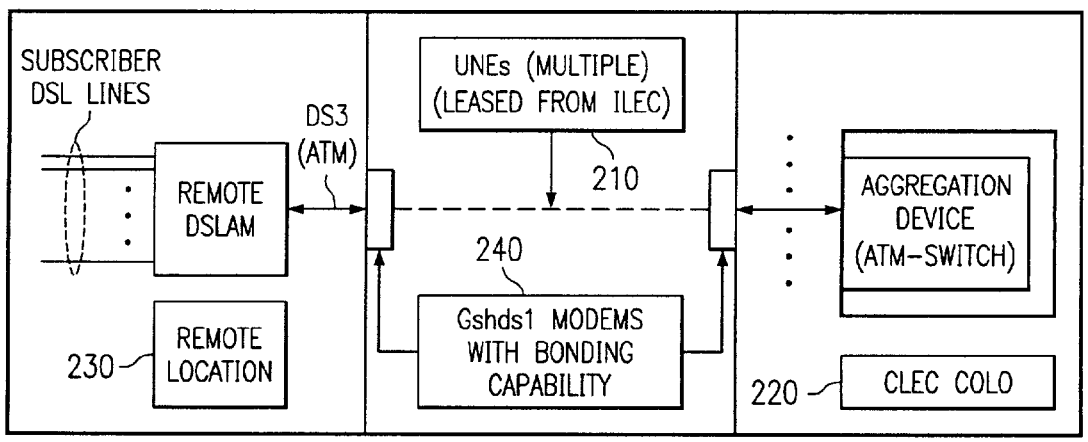
FIG. 2 illustrates bonding multiple loops to achieve an appropriate channel capacity, representing an embodiment of the invention.

Referring to FIG. 2, a generalized embodiment where multiple G.shdsl loops are bonded together to provide the requisite channel capacity is depicted. In contrast to the high cost of the leased DS3, unbundled network element (UNE) 210 loops can be leased from the ILEC for much less than the cost of leasing a DS3. The notion of an unbundled network element can be embodied by the ILEC providing dry copper loops between the CLEC COLO 220 and the remote location 230. The CLEC 220 is permitted to utilize this copper loop in any desired fashion within the bounds of regulatory constraints. In particular, the CLEC 220 can deploy G.shdsl modems 240 with bonding and/or debonding capability at the remote locations and in the COLO 220. If the distance between the locations is short, less than 6 kft, then each pair can transport 2.3 Mbps and the desired backhaul of 10 to 15 Mbps can be achieved using about 8 UNE-loops, assuming that appropriate equipment is deployed at the two ends. At longer distances, a greater number of UNE-loops 210 is required to backhaul such a desired bandwidth. Equivalently, for a given number of loops, the total data rate supported decreases with distance. In an extreme case, consider an entire binder group of 25 loops leased for a fraction of the cost of a leased DS3. Even with loop lengths of the order of 20 kft (26 AWG), G.shdsl 240 can support payload rates of about 200 kbps, corresponding to an overall payload capacity of about 5 Mbps. This data rate could be achieved using 4 leased T1s in an inverse multiplexing arrangement over ATM (IMA) at a cost per month that is less than the cost of leasing a DS3. Clearly, G.shdsl 240 deployed in a multiple loop configuration provides an economic approach for backhaul, provided a method can be developed to bond multiple G.shdsl loops in a flexible, scalable, and efficient manner.

Figure 3:
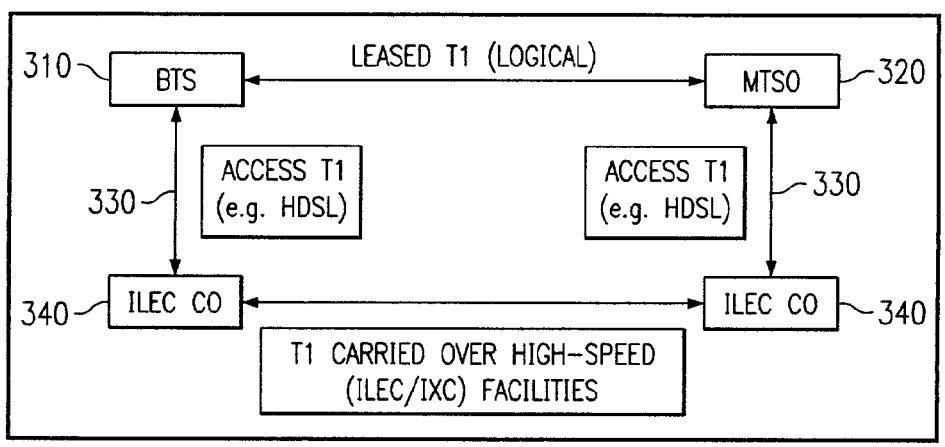
FIG. 3 illustrates a leased T1 between BTS and MTSO, representing an embodiment of the invention.

Referring to FIG. 3, a different scenario is depicted. FIG. 3 depicts a situation of a wireless service provider (WSP) with a multiplicity of base-stations (BSs or Base Transceiver Stations (BTSs)) 310 that home into a switching center, often called a Mobile Telephone Switching Office (MTSO) or mobile switching office (MSO)) 320. The most common form of connectivity between a BTS 310 and MTSO 320 is a leased T1 330 from the ILEC 340.

The approach used to provide this T1 involves a copper link, either repeatered T1 or HDSL or repeatered HDSL, between the BTS and the most convenient ILEC CO, usually the closest to the BTS. The T1 is carried between the ILEC CO and the WSP-MTSO using high-speed facilities belonging to the ILEC. If the MTSO is served by copper rather than fiber, then the ILEC high-speed facilities are utilized between the COs serving the BTS and the MTSO and copper (T1/HDSL) for the access components depicted in FIG. 3.

If the BTS and MTSO are geographically widely separated, then the effective T1 link between BTS and MTSO may be provided by an inter-exchange carrier (IXC). In this situation, the IXC leases the access T1s from the ILEC and passes this access cost on to the WSP. The high-speed facilities, in this case, are owned by the IXC.

Figure 4:
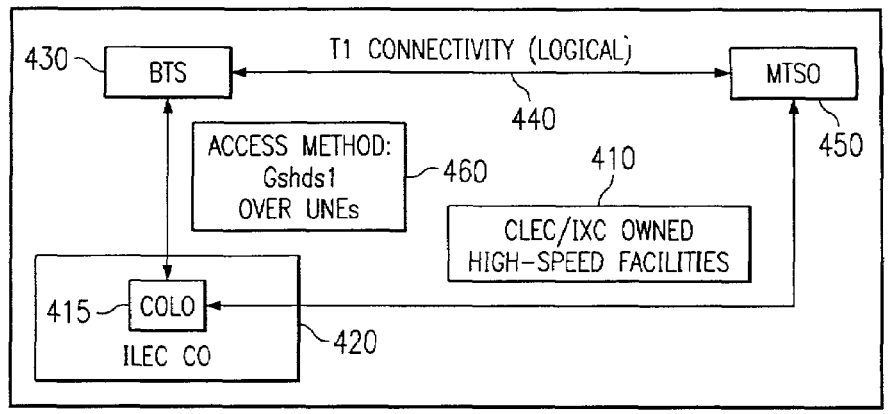
FIG. 4 illustrates T1 connectivity between BTS and MTSO provided by WSP/CLEC/IXC, representing an embodiment of the invention.

Referring to FIG. 4, in many jurisdictions, the IXC 410 operates as a CLEC as well as a WSP. In this situation, the WSP/CLEC/IXC 410 is very likely to have a COLO 415 installation in the ILEC CO 420 serving the BTS 430 and have high-speed transmission facilities to transport the T1 440 between the COLO 415 and the MTSO 450. Thus, to get the T1 440 connectivity between the BTS 430 and the MTSO 450, the WSP/CLEC/IXC 410 needs to lease UNEs 460 between the ILEC CO 420 and the BTS 430. This is considerably more cost effective to the WSP/CLEC/IXC 410 than leasing a T1 440 from the ILEC 420 between the two end points, BTS 430 and MTSO 450. This is depicted in FIG. 4. To take full advantage of UNE pricing, it is necessary that the WSP/CLEC/IXC 401 not require that the ILEC 420 deploy repeaters on the loops between the ILEC CO 420 and the BTS 430.

For clarity of explanation, a specific configuration is now considered. The BTS, or equivalent, has 4 DS1s of traffic that must be transported over the UNEs (copper loops) between the remote location and the COLO equipment. The backhaul can utilize up to 4 copper loops. This specificity is for exemplary reasons only; the methods described can be generalized to a multitude of other scenarios.

G.shdsl can be operated in numerous modes defined in the G.shdsl standard. In the synchronous or framed mode, the traffic is synchronized, from the viewpoint of time-base, to the underlying frame structure used by the G.shdsl transceiver. In the asynchronous or unframed mode, the G.shdsl time-base is used to control the traffic data rate. Minor frequency variations between the G.shdsl timebase and the traffic timebase are accounted for using stuff bits. It is assumed that in the backhaul application, the transceivers operate in the synchronous mode. Time-base inequities between the traffic DS1 and the G.shdsl transport mechanism can be resolved using traditional DS1 slip buffers in two terminal ends of the backhaul link.

Figure 5:
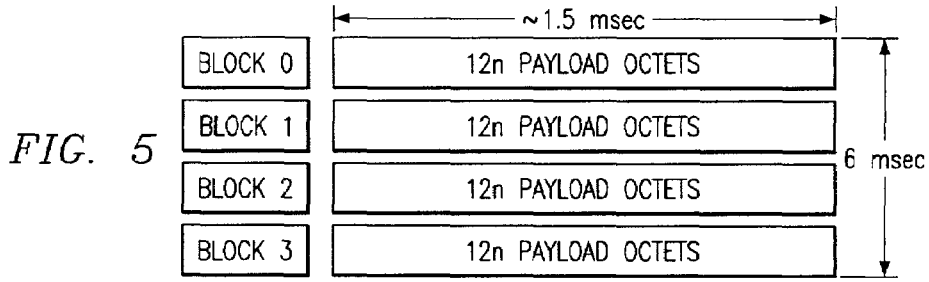
FIG. 5 illustrates a block structure of G.shdsl payload bits, representing an embodiment of the invention.

The G.shdsl standard calls out numerous ways of formatting the information bits into the payload. For specificity, the following organization of data, and underlying timing issues, is assumed. A block contains overhead bits plus payload bits. Number of payload bits=$k=12(i+8n)$; the parameters i and n are negotiated by the STU-C and STU-R during initialization. In addition to the payload are the overhead bits for framing and the embedded operations channel (EOC). The duration of the block is 1.5 msec. In the backhaul application, it is assumed that i=0 and thus each block contains 12n octets of payload data corresponding to a payload bit-rate of 64n kbps. It is convenient to visualize a block as comprised of 12 sub-blocks. A frame or super-block is of duration 6 msec and is comprised of 4 blocks. From the viewpoint of payload, all blocks are equivalent; from the viewpoint of overhead, each block contains different information. One 14-bit pattern (Frame Sync Word) is used to identify the start of the frame. Each frame can contain 4k payload bits and 48 overhead bits. Some vendor specific implementations may have 50 overhead bits. The payload capacity is thus 64n kbps, assuming i=0, and the organization of data in blocks can be represented as in FIG. 5.

For the backhaul application it is convenient to consider the DS1 payload as an assembly of 8 c-channels, where each c-channel corresponds to a 192 kbps bit-stream, or 6 d-channels, or 4 f-channels, or 3 h-channels, or 2 I-channels, or 1 x-channel. The nomenclature is based on c being the third letter of the alphabet and 192 kbps=3×64 or 3 DS0$s$. Other sub-channels that are identified are d-channels (4 DS0$s$ or 256 kbps), f-channels (6 DS0$s$ or 384 kbps); h-channels (8 DS0$s$ or 512 kbps); I-channels (12 DS0$s$ or 768 kbps); and x-channels (24 DS0$s$ or 1.536 Mbps, the DS1 payload rate). The payload capacity of the G.shdsl link, namely 64n kbps, thus corresponds to m=(n/3) c-channels. It is assumed that n is a multiple of 3, m is an integer, and the c-channels can be numbered as ranging from 0 to (m-1).

Figure 6:
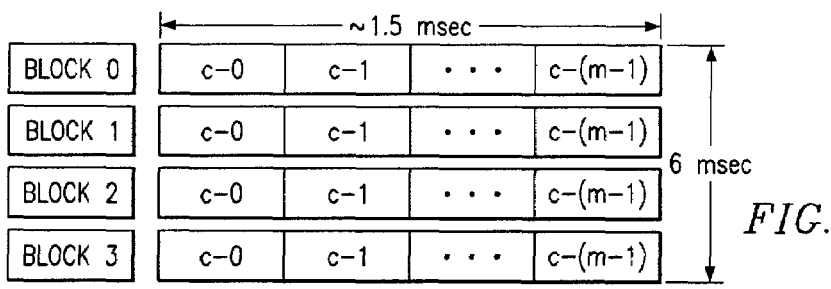
FIG. 6 illustrates an association of c-channels and G.shdsl payload blocks, representing an embodiment of the invention.

Referring to FIG. 6, G.shdsl payload bits can be associated with c-channels. Depending on the value of n, it may be advantageous to associate the G.shdsl payload with the other types of channels defined above.

The actual number of c-channels that can be transported across a G.shdsl link is dependent on the payload capacity that in turn depends on the length of the subscriber (copper) loop used and the cross-talk present. Table 1 provides the payload capacity of G.shdsl as a function of loop length. In particular, for a given number of c-channels, the maximum loop length is provided. Since the performance depends on length as well as cross-talk, and the latter is difficult to establish in an absolute manner, one column of the table provides the length based on high levels of cross-talk or noise and another column for the case where cross-talk is minimal or absent. The former is taken from the G.shdsl standard and can be considered conservative or pessimistic whereas the latter is extracted from chip vendor documentation and should be considered optimistic.

TABLE 1

| # of c-channels (m) | n | Payload rate kbps | Max. loop length (26 AWG) no-noise | Max. loop length (26 AWG) high-noise |
|---|---|---|---|---|
| 1 | 3 | 192 | 21.4 kft | 20 kft |
| 2 | 6 | 384 | 19.9 kft | 15 kft |
| 4 | 12 | 768 | 17.5 kft | 11 kft |
| 6 | 18 | 1152 | 15.8 kft | (not provided) |
| 8 (1 DS1) | 24 | 1536 | 14.0 kft | 8 kft |
| 12 (1.5 DS1s) | 36 | 2304 | 12.5 kft | 6.4 kft |

Figure 7:
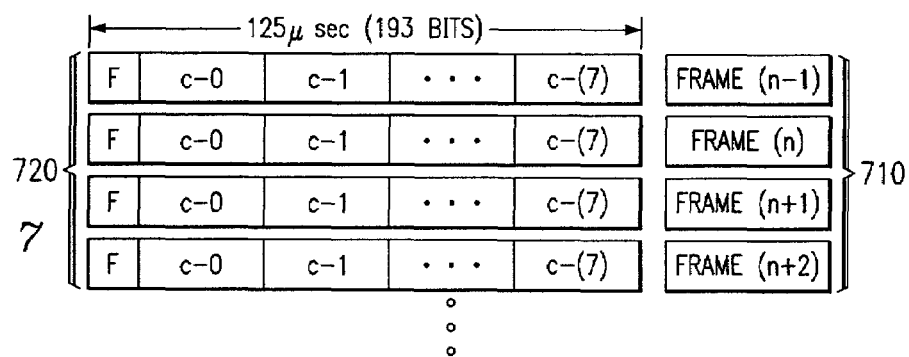
FIG. 7 illustrates a DS1 frame structure showing payload comprised of 8 c-channels, representing an embodiment of the invention.

Referring to FIG. 7, a DS1 signal can also be viewed as an assembly of c-channels 720 (or x-channel, or h-channels, etc.). The frame structure of DS1 is based on a 125 μsec frame 710 comprising 193 bits. Of these 1 is a framing bit, or F bit, and the remaining 192 bits comprise the payload. Thus a DS1 frame 710 can be viewed as a combination of 24 DS0s (24 octets); or 8 c-channels 720 since each c-channel is equivalent to 3 octets per frame or 3 DS0s; and so on.

In addition to providing frame definition, the framing bit pattern can also be used to establish a super-frame (SF) structure. The SF frame format permits numbering of frames modulo-12; the extended super-frame (ESF) format permits the numbering of frames modulo-24. Conventionally, frame numbers are 1, 2, . . . , 12 in SF and 1, 2, 3, . . . , 24, in ESF modes. Frame numbering is necessary when per-channel signaling is carried in a robbed-bit format. In particular, the least significant bits of the octets in frame-6, frame-12 (in SF; in ESF frame-18 and frame-24 are added) are bits associated with that DS0 and represent the signaling state of that channel. In SF the bits are called A (frame-6) and B (frame-12); in ESF, C (frame-18) and D (frame-24) are added. If the DS0 content is pure data, and channel state information is transported by means other than robbed-bit signaling, then all frames are equivalent and the notion of frame numbering is moot.

There are many priority assignment schemes that can be devised. The need for prioritization arises if the aggregate G.shdsl backhaul payload rate is less than the aggregate payload rate of the DS1s being transported. Two such prioritization schemes are described immediately below.

In Plan A, the priority is DS1#0>DS1#1>DS1#2>DS1#3 (assuming 4 DS1s). Within a DS1, c-0>c-1>. . .>c-7. Traffic in DS1#0 has priority over traffic in DS1#1 and so on. Lower numbered c-channels, or DS0s, have higher priority over higher-numbered c-channels.

In Plan B, priority is given to lower-numbered c-channels, regardless of which DS1 they are in. For a given c-channel, the c-channel in a lower numbered DS1 has priority over the same c-channel in a higher numbered DS1.

Other priority schemes can be proposed. However, the multiplexing scheme described here can easily be modified to accommodate all rational prioritization schemes.

Another view of the data-distance profile of G.shdsl links is provided In Table 2. Here the payload is supported as a function of loop length in both no-noise and high-noise environments. The capacity is viewed in terms of number of c-channels as well as corresponding bit-rate. As shown in Table 2, if the loop length is much greater than 20 kft of 26 AWG cable, then the capacity is negligible; for loop lengths less than 19 kft, a payload rate of 384 kbps, or 2 c-channels, can be supported. At the other extreme, if the loop length is less than about 12 kft, 12 c-channels can be transported over a single G.shdsl link in a low-noise environment. Operating at a payload rate less than the maximum implies additional signal-to-noise ratio margin.

TABLE 2

| Loop Length (kft; 26 AWG) | Low-Noise/No-Noise Payload: kbps/#-of-c-chan. | High-Noise Payload: kbps/#-of-c-chan. |
|---|---|---|
| <~20+ kft | 192 kbps; 1 c-channel | 192 kbps; 1 c-channel |
| <~19 kft | 384 kbps; 2 c-channels | 192 kbps; 1 c-channel |
| <~17 kft | 768 kbps; 4 c-channels | 192 kbps; 1 c-channel |
| <~15 kft | 768 kbps; 4 c-channels | 384 kbps; 2 c-channels |
| <~14 kft | 1536 kbps; 8 c-channels | |
| <~12 kft | 2304 kbps; 12 c-channels | 768 kbps; 4 c-channels |
| <~8 kft | | 1536 kbps; 8 c-channels |
| <~6 kft | | 2304 kbps; 12 c-channels |

For a DS1 Backhaul, the following assumptions for specificity are made. The backhaul STU-R, the remote end, will have 4 DS1s of traffic on the drop-side and up to 4 G.shdsl links in the line-side; The STU-C, the central office end, will be likewise. The DS1s are framed. The intent is to transport as much of the DS1 payload as possible over the 4 G.shdsl links. The intent is to use as few G.shdsl links as possible. All G.shdsl links are operated at the same payload rate. The G.shdsl payload rate is determined at start-up and then fixed. The prioritization scheme will be Plan A; the system is synchronous. All G.shdsl links and all the DS1s have the same time-base. Furthermore, the G.shdsl links are transmitted in a frame-synchronous arrangement. The traffic is clear channel, not robbed-bit, signaling.

Table 3 shows the mapping of the DS1 payloads into the G.shdsl payloads. Depending on the capacity of the G.shdsl links, mappings are provided to show how the DS1 payloads can be transported. The nomenclature used for identifying the DS1 payload data is c-0 through c-7 for the 8 c-channels in a DS1 payload; f-0 through f-3 are the 4 f-channels in a DS1 payload; h-0, h-1, and h-2 are the three h-channels in a DS1 payload; I-0 and I-1 are the 2 I-channels in a DS1 payload; x is the x-channel, or the DS1 payload itself. The quantity n is the number of octets in each G.shdsl sub-block. It should be noted that there are alternative mappings and Table 3 is exemplary and not restrictive. Case 1 and 2 are situations where all 4 DS1 payloads can be transported; cases 3 through 7 are situations where the G.shdsl transport capability is less than 4 complete DS1s and thus prioritization comes into play.

TABLE 3

| Case# | G.shdsl payload rate | G.shdsl #0 Contents | G.shdsl #1 Contents | G.shdsl #2 Contents | G.shdsl #3 Contents | Comments |
|---|---|---|---|---|---|---|
| 1 | 2048 kbps n = 32 | DS1#0-x DS1#3-h-0 | DS1#1-x DS1#3-h-1 | DS1#2-x DS1#3-h-2 | Not needed | (1-⅓)-DS1 per G.shdsl |
| 2 | 1536 kbps n = 24 | DS1#0-x | DS1#1-x | DS1#2-x | DS1#3-x | 1 DS1 per G.shdsl |
| 3 | 192 kbps n = 3 | DS1#0-c-0 | DS1#0-c-1 | DS1#0-c-2 | DS1#0-c-3 | (½)-DS1#0, DS1#1 through #3 are blocked |
| 4 | 384 kbps n = 6 | DS1#0-f-0 | DS1#0-f-1 | DS1#0-f-2 | DS1#0-f-3 | DS1#1 through #3 are blocked |
| 5 | 512 kbps n = 8 | DS1#0-h-0 | DS1#0-h-1 | DS1#0-h-2 | DS1#1-h-0 | (⅓)-DS1#1, DS1#2 and #3 are blocked |
| 5 | 512 kbps n = 8 | DS1#0-h-0 | DS1#0-h-1 | DS1#0-h-2 | DS1#1-h-0 | (⅓)-DS1#1, DS1#2 and #3 are blocked |
| 6 | 768 kbps n = 12 | DS1#0-l-0 | DS1#0-l-1 | DS1#1-l-0 | DS1#1-l-1 | DS1#2 and #3 are blocked |
| 7 | 1024 kbps n = 16 | DS1#0-h-0 and h-1 | DS1#0-h-2 and DS1#1-h-0 | DS1#1-h-1 and h-2 | DS1#2-h-0 and h-1 | (⅓)-DS1#2, and DS1#3 are blocked |

Clearly the association of DS1 payload data to G.shdsl payload is not unique and numerous such mappings can be postulated. Also, the extension to cases where the number of G.shdsl links is greater or less than 4 is straightforward.

Figure 8:
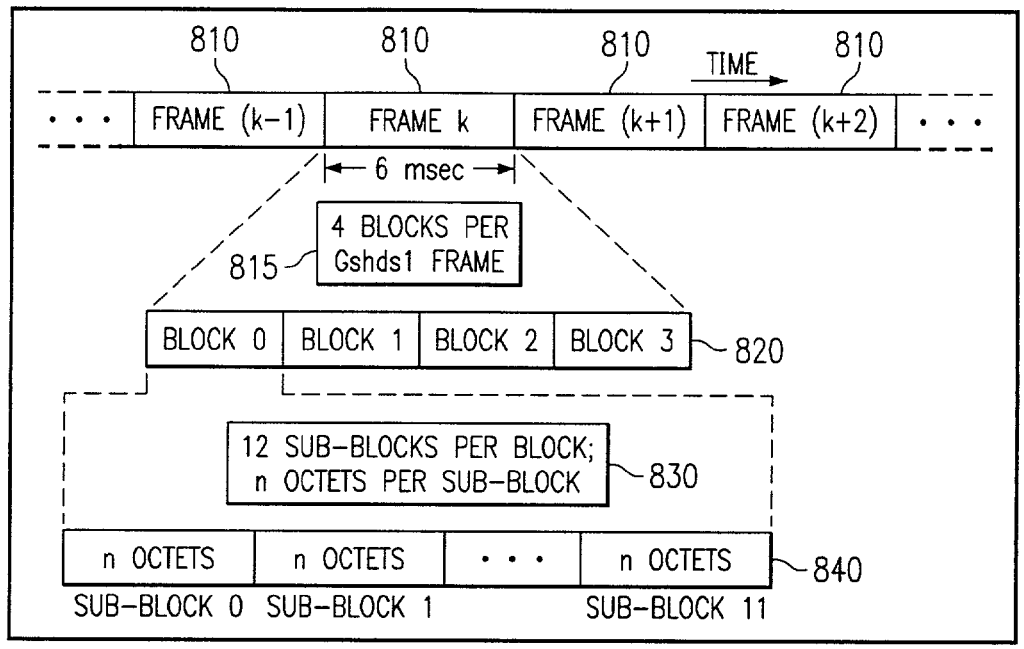
FIG. 8 illustrates a G.shdsl structure showing frames, blocks, and sub-blocks, representing an embodiment of the invention.

Referring to FIG. 8, the multiplexing scheme is based on the interpretation of the G.shdsl payload as being comprised of 6 msec frames 810; each frame 810 is comprised of 4 blocks 815; and each block 820 comprised of 12 sub-blocks 830 with n octets per sub-block. Each sub-block 840 is of duration 125 μsec, equivalent to one DS1 frame. Thus, a G.shdsl assembly is depicted in FIG. 8.

The multiplexing scheme is based on the observation that each G.shdsl sub-block corresponds to one DS1 frame (125 microsec.). That is, the DS1 data in a frame, namely 24 DS0s (labeled DS0-0 through DS0-23) is mapped into a sub-block. Some of the cases of Table 3 are describe in detail below. The extension to the other cases, and other assignment situations is straightforward.

Figure 9:
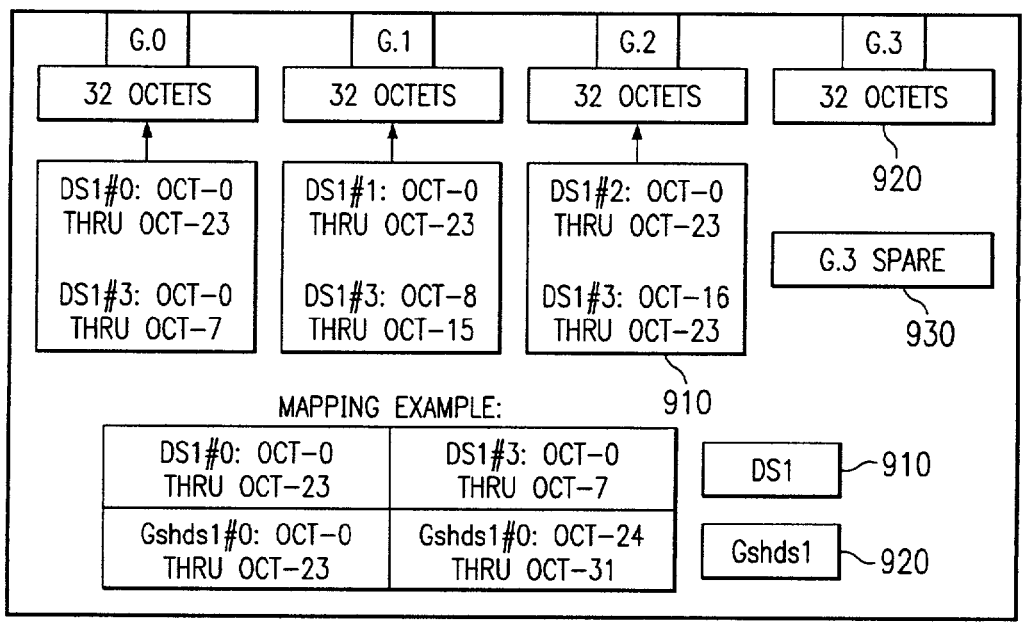
FIG. 9 illustrates a mapping of DS1 payloads into G.shdsl sub-blocks for Case 1 (n=32), representing an embodiment of the invention.

In all cases, the multiplexing scheme used establishes a relationship between DS1 payload data 910 and the G.shdsl sub-blocks 920. Referring to FIG. 9, which illustrates a mapping for Case 1 (n=32), the four G.shdsls 920 are numbered G-0, G-1, G-2, and G-3. The 24 octets of a DS1 payload 910 are referred to as oct-0 through oct-23. One specific mapping, or association of the 32 DS1 octets and the 32 octet positions in a G.shdsl sub-block 920 is specified in FIG. 9, though in practice the mapping will be chosen based on implementation convenience. Note that in this case the fourth G.shdsl link 930 is spare since the entire payload of 4 DS1s can be carried in 3 G.shdsls.

Figure 10:
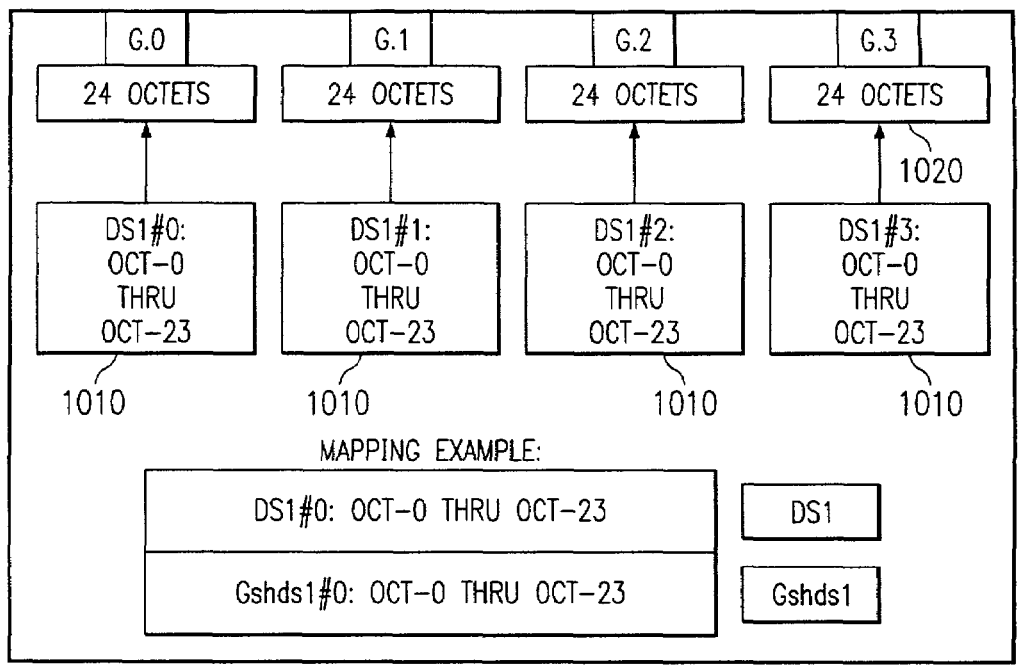
FIG. 10 illustrates a mapping of DS1 to G.shdsl for Case 2 (n=24), representing an embodiment of the invention.

Referring to FIG. 10, the mapping of the DS1 payload and G.shdsl payload for Case 2 (n=24) is depicted. In this case, all 4 G.shdsl links 1020 are used and the entire DS1 payload 1010 for all 4 DS1s can be transported over the back-haul links.

Figure 11:
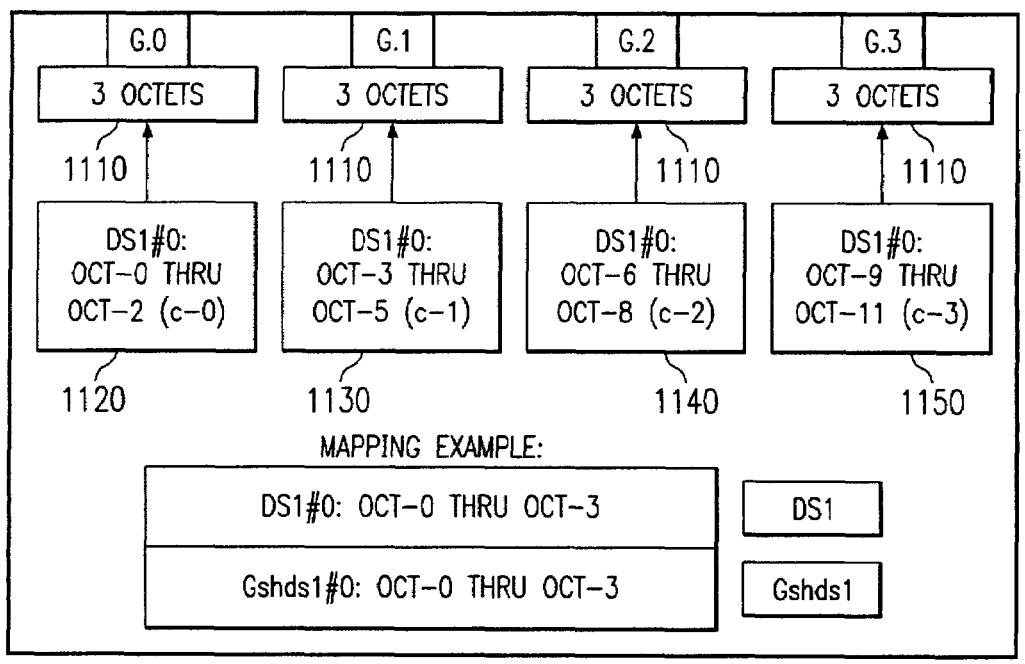
FIG. 11 illustrates a mapping of DS1 into G.shdsl for Case 3 (n=3), representing an embodiment of the invention.

Referring to FIG. 11, a mapping for Case 3 (n=3) is depicted. In this case, all 4 G.shdsl links 1110 are used but only 12 DS0s of DS1#0 1120 can be transported over the back-haul links. DS1#1 1130, DS1#2 1140, and DS1#3 1150 are completely blocked as is half of DS1#0 1120.

Figure 12:
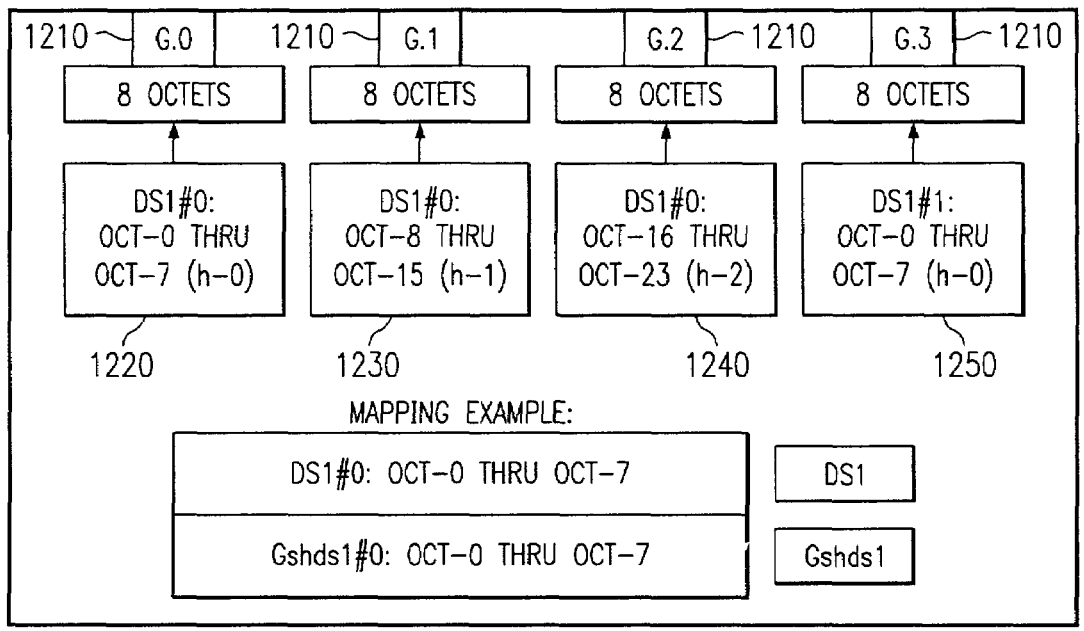
FIG. 12 illustrates a DS1 to G.shdsl mapping for Case 5 (n=8), representing an embodiment of the invention.

For brevity, some of the cases, such as Cases 4, 6, and 7, and several others not spelled out in Table 3, are not described in detail. Referring to FIG. 12, a mapping for Case 5 (n=8) is depicted. The net transport capacity for this case of the 4 G.shdsls 1210 is 32 DS0s. That is, the DS1#0 1220 payload is transported in its entirety; just one-third of the payload of DS1#1 1230 is carried whereas DS1#2 1240 and DS1#3 1250 are entirely blocked.

There may be situations where data from a given DS1 is not available. For example, the DS1 input may be disconnected due to loss-of-signal (LOS), may be malfunctioning because of loss-of-frame synchronization (LOF), or otherwise unavailable. Implicit in the multiplexing scheme for back-haul is that these alarm condition notification is done using the embedded operations channel (EOC) available in the G.shdsl link or an equivalent method. Most typically, this information is carried by G.shdsl #0, the primary link, using other links as back-up.

Dual-port RAMs (DPRs) are a versatile tool in digital circuit design and their use is well understood. Many field programmable gate arrays (FPGAs), such as those marketed by Xilinx Corporation, have built-in macros for designing in DPRs of various form-factors and capacity. The implementation described uses DPR elements to transfer octets from the DS1 side to the G.shdsl side in an effective manner. For specificity, the transfer of data shall be described in the DS1-to-G.shdsl direction. The scheme can be readily extended to the other direction of data transfer.

One Dual-port RAM (DPR) module is associated with each G.shdsl transmitter. The G.shdsl transmitter reads the outgoing data octets from the DPR module. It suffices that the DPR modules have storage capacity equivalent to two sub-blocks. Hence it can be assumed that the DPR capacity is 64 octets or bytes to accommodate the case where n=32. In other cases, there may be unused capacity. The 64 octets are organized as two pages of 32 octets each, which shall be referred to as page-A and page-B. The transmitter reads octets for even numbered sub-blocks (#0, #2, #4, #6, #8, #10) from page-A and octets for odd-numbered sub-blocks (#1, #3, #5, #7, #9, #11) from page-B. Thus the transmitter read operations could be viewed as a sequential access from the DPR module operated as a circular buffer (i.e. with address wrap-around). Since the 4 G.shdsl transmitters are frame-synchronized, all four are reading out octets for the same sub-block and consequently a single address generation circuit module can be used for all four DPR modules. By organizing the write operations, where the DS1 payload data writes into the DPR modules, to occur in page-B when the G.shdsl read operations are occurring in Page-A, and vice-versa, address contention in the DPR is avoided. This paging method is appropriate for ensuring that a write operation and a read operation do not access the same memory location.

Figure 13:
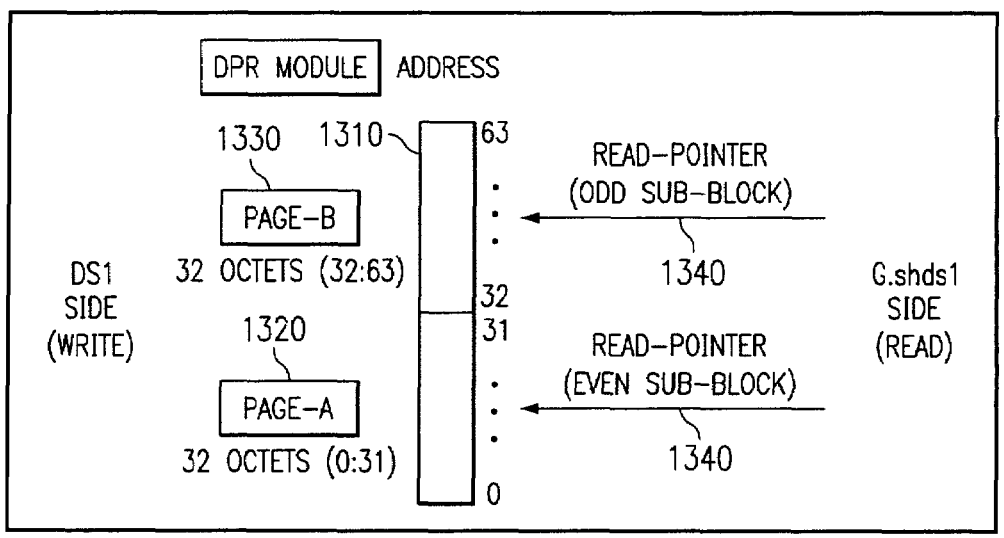
FIG. 13 illustrates a functional depiction of a DPR module, representing an embodiment of the invention.

Referring to FIG. 13, a structure of a DPR module is depicted. There are 64 locations 1310 designated by address as 0, 1, 2, . . . , 63. Locations 0 through 31 are the 32 locations for Page-A 1320 and locations 32 through 63 correspond to Page-B 1330. The read pointer 1340 denotes the address being accessed in the read operation. For even or odd sub-blocks, the pointer will be directed towards Page-A 1320 or Page-B 1330, respectively. The read pointer 1340 cycles through the locations {0, 1, . . . , (n-1), 32, 33, . . . , (31+n)} in a continuous fashion. The time slice for the first octet in the G.shdsl frame is time-aligned with address 0 and thus each even-numbered sub-block of n octets is aligned with Page-A 1320 and each odd-numbered sub-block of n octets is aligned with Page-B 1330. The specific value of n depends on the payload rate of the G.shdsl links.

Though not necessary, it is helpful to make the read operation a read-modify-write operation. The octet from the DPR is read out and passed to the transmitter. In the same locations, a fixed pattern, preferably all-1s (octet=11111111 in binary), is written back.

The data written into the DPR module emanates from the incoming DS1 signals. Conventional DS1 interface circuitry is used to extract the payload octets. A line-interface unit (LIU) extracts the bit-stream and a DS1 framer circuit performs the functions of frame-synchronization and extraction of the payload octets. Numerous framer integrated circuits (ICs) are available, such as the DS21Q352 from Dallas Semiconductor corporation which provides 4 framers in a single chip.

All conventional DS1 framer chips provide the facility of a slip-buffer. This buffer allows for time-base differences between the actual DS1 signal on the line and master clock used to extract the information octets for further processing. A slip-buffer is a double-buffer or two-page arrangement where each page contains an entire frame-payload of 24 octets. The operation is similar to the double buffer arrangement using DPRs postulated for the transfer of octets between DS1 and G.shdsl links described above. Of special importance, the double-buffer arrangement allows the payload octets to be read on a frame-by-frame basis without concern about the alignment of the incoming DS1 frame with the frame structure associated with reading out of the slip-buffer. Thus all four DS1s on the line side can have different start-of-frame epochs, but can be read out from the respective slip-buffers in a frame-aligned manner where frame refers to the DS1 frame of 125 μsec.

Figure 14:
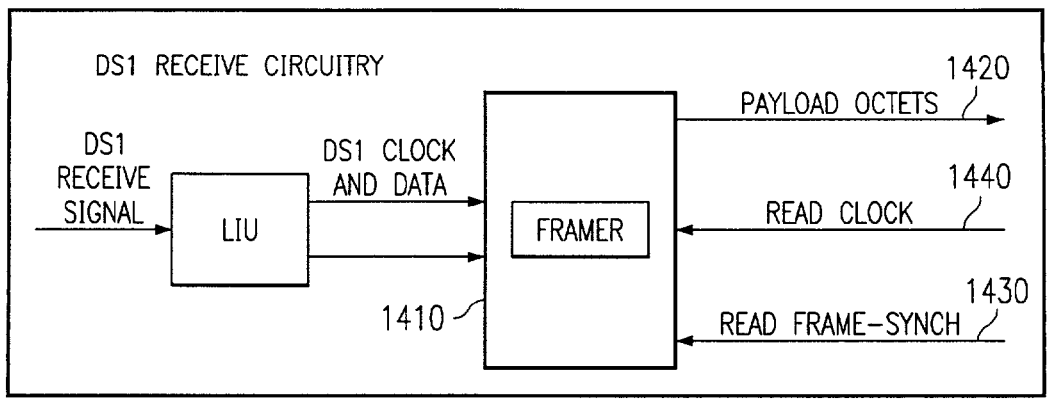
FIG. 14 illustrates an outline of the DS1 receive circuitry (each DS1), representing an embodiment of the invention.

Referring to FIG. 14, the framer circuitry 1410 extracts the DS1 payload octets 1420 that are read out from the chip and these octets 1420 are written into the DPR modules. The slip buffer arrangement allows the extraction of DS1 payload octets 1420 in a manner that is frame-synchronous with the G.shdsl frame. In other words, the timing signal called read frame-synch 1430 is aligned with the start-of-sub-block read-timing 1440 on the G.shdsl side of the DPR module. The synchronous nature of the system guarantees that the data octets 1420 extracted in a DS1 frame from the framer chips can be written into the opposite page from where the G.shdsl transmitters are reading out octets, thus ensuring that memory address contention is absent. If the DS1 framers 1410 are 4 independent chips, then the read frame-synch timing signal 1430 for the 4 chips must be offset from G.shdsl start-of-sub-block by 0, 1, 2, and 3 sub-slice intervals for DS1#0, DS1#1, DS1#2, and DS1#3, respectively.

Whereas the G.shdsl read access to the DPR module is sequential, the write addresses are not necessarily sequential. Furthermore, there is one DPR module per G.shdsl, so DS1 data octets from DS1#0 may have to be written into any one of the 4 DPR modules. In other words, the DS1 write access is random.

In each sub-block interval of 125 μsec, each DS1 provides 24 octets (24 DS0s); this implies that the 125 μsec can be split into 24 (or even 32, with 8 time-slices used for auxiliary purposes) time-slices, with each time-slice being further split up into 4 sub-slices (one for each DS1). These time-slices can be numbered sl#0 through sl#23 and further subdivided as sl#0-0, sl#0-1, sl#0-2, and sl#0-3 to indicate the four sub-slices. In time (sub-)slice, sl#k-m, octet-number-k from DS1#m is written into a DPR module. Implementation of the multiplexing scheme then reduces at its core to assigning the proper write-address during each time sub-slice.

Referring to Table 4, the address assignment required to implement case 1 is provided. The notion of increasing time is left-to-right and top-to-bottom. The fact that the DS1 data is being written into the opposite page relative to the read operation from the G.shdsl side is not explicitly indicated in Table 4 but is implicit. The notation DPR-k(m) implies the destination is the DPR module associated with G.shdsl#k in address m (the address goes from 0 through 31 in Page-A and from 32 through 63 in Page-B). For convenience, it is assumed that the destination is in Page-A. The notion of a null address is that the write operation involves addresses that are not associated with any payload data.

TABLE 4

Address assignments for n = 32

| Sl#K-M | M = 0 | M = 1 | M = 2 | M = 3 |
|---|---|---|---|---|
| K = 0 | DPR-0(0) | DPR-1(0) | DPR-2(0) | DPR-0(24) |
| K = 1 | DPR-0(1) | DPR-1(1) | DPR-2(1) | DPR-0(25) |
| K = 2 | DPR-0(2) | DPR-1(2) | DPR-2(2) | DPR-0(26) |
| K = 3 | DPR-0(3) | DPR-1(3) | DPR-2(3) | DPR-0(27) |
| K = 4 | DPR-0(4) | DPR-1(4) | DPR-2(4) | DPR-0(28) |
| K = 5 | DPR-0(5) | DPR-1(5) | DPR-2(5) | DPR-0(29) |
| K = 6 | DPR-0(6) | DPR-1(6) | DPR-2(6) | DPR-0(30) |
| K = 7 | DPR-0(7) | DPR-1(7) | DPR-2(7) | DPR-0(31) |
| K = 8 | DPR-0(8) | DPR-1(8) | DPR-2(8) | DPR-1(24) |
| K = 9 | DPR-0(9) | DPR-1(9) | DPR-2(9) | DPR-1(25) |
| K = 10 | DPR-0(10) | DPR-1(10) | DPR-2(10) | DPR-1(26) |
| K = 11 | DPR-0(11) | DPR-1(11) | DPR-2(11) | DPR-1(27) |
| K = 12 | DPR-0(12) | DPR-1(12) | DPR-2(12) | DPR-1(28) |

TABLE 4-continued

Address assignments for n = 32

| SI#K-M | M = 0 | M = 1 | M = 2 | M = 3 |
|---|---|---|---|---|
| K = 13 | DPR-0(13) | DPR-1(13) | DPR-2(13) | DPR-1(29) |
| K = 14 | DPR-0(14) | DPR-1(14) | DPR-2(14) | DPR-1(30) |
| K = 15 | DPR-0(15) | DPR-1(15) | DPR-2(15) | DPR-1(31) |
| K = 16 | DPR-0(16) | DPR-1(16) | DPR-2(16) | DPR-2(24) |
| K = 17 | DPR-0(17) | DPR-1(17) | DPR-2(17) | DPR-2(25) |
| K = 18 | DPR-0(18) | DPR-1(18) | DPR-2(18) | DPR-2(26) |
| K = 19 | DPR-0(19) | DPR-1(19) | DPR-2(19) | DPR-2(27) |
| K = 20 | DPR-0(20) | DPR-1(20) | DPR-2(20) | DPR-2(28) |
| K = 21 | DPR-0(21) | DPR-1(21) | DPR-2(21) | DPR-2(29) |
| K = 22 | DPR-0(22) | DPR-1(22) | DPR-2(22) | DPR-2(30) |
| K = 23 | DPR-0(23) | DPR-1(23) | DPR-2(23) | DPR-2(31) |
| K = 24, . . . ,31 | null | Null | null | null |

To further illustrate the translation from the mapping scheme to write-address, consider a case where n=8. Here, only 32 DS0s can be transported over the G.shdsl links and DS1#2 and DS1#3 are blocked as are 16 DS0s from DS1#1. The notion of a blocked DS0, say DS0#k from DS1#m, is that the entry in Table 5 for sl#k-m is null.

TABLE 5

Address assignments for n = 8

| SI#K–M | M = 0 | M = 1 | M = 2 | M = 3 |
|---|---|---|---|---|
| K = 0 | DPR-0(0) | DPR-3(0) | null | null |
| K = 1 | DPR-0(1) | DPR-3(1) | null | null |
| K = 2 | DPR-0(2) | DPR-3(2) | null | null |
| K = 3 | DPR-0(3) | DPR-3(3) | null | null |
| K = 4 | DPR-0(4) | DPR-3(4) | null | null |
| K = 5 | DPR-0(5) | DPR-3(5) | null | null |
| K = 6 | DPR-0(6) | DPR-3(6) | null | null |
| K = 7 | DPR-0(7) | DPR-3(7) | null | null |
| K = 8 | DPR-1(0) | DPR-3(8) | null | null |
| K = 9 | DPR-1(1) | Null | null | null |
| K = 10 | DPR-1(2) | Null | null | null |
| K = 11 | DPR-1(3) | Null | null | null |
| K = 12 | DPR-1(4) | Null | null | null |
| K = 13 | DPR-1(5) | Null | null | null |
| K = 14 | DPR-1(6) | Null | null | null |
| K = 15 | DPR-1(7) | Null | null | null |
| K = 16 | DPR-2(0) | Null | null | null |
| K = 17 | DPR-2(1) | Null | null | null |
| K = 18 | DPR-2(2) | Null | null | null |
| K = 19 | DPR-2(3) | Null | null | null |
| K = 20 | DPR-2(4) | Null | null | null |
| K = 21 | DPR-2(5) | Null | null | null |
| K = 22 | DPR-2(6) | Null | null | null |
| K = 23 | DPR-2(7) | Null | null | null |
| K = 24, . . . , 31 | Null | Null | null | null |

Whereas only two examples, those corresponding to n=32 and n=8 have been presented in Tables 3 and 4, respectively, the equivalent tables for other cases and extensions thereto, are very simply obtained if the principles implicitly embodied in Tables 3 and 4 in conjunction with the principles of the multiplexing scheme are adhered to.

Figure 15:
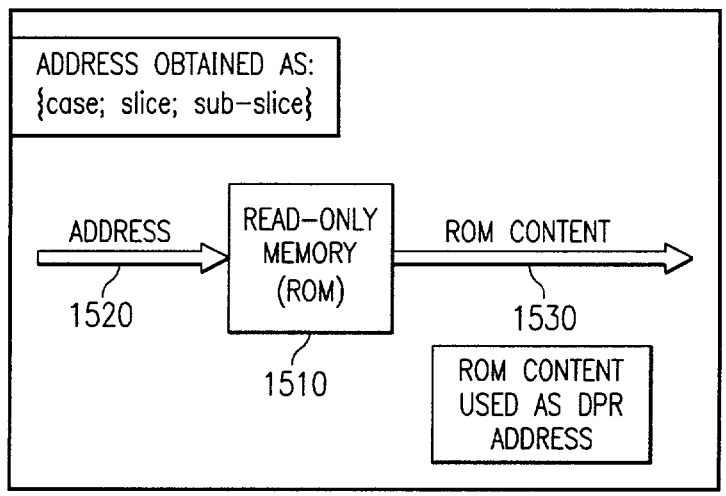
FIG. 15 illustrates a ROM implementation of Table Lookup for address assignment, representing an embodiment of the invention.

Referring to FIG. 15, there are numerous techniques for embodying the address assignments such as specified in Tables 4 and 5. One such method is table lookup. The table lookup method utilizes a read-only memory (ROM) to store the address assignment.

With reference to FIG. 15, the ROM 1510 can be partitioned to hold the address 1520 assignments of all relevant cases. Therefore, part of the ROM-address is the identity of the case and the rest of the ROM-address is obtained from the identities of the slice and sub-slice. The ROM contents 1530 correspond to the assigned DPR address for that particular case/slice/sub-slice. As shown in Table 5, for the case where n=8, slice=2, sub-slice=1, the ROM contents will be equivalent to DPR-3(2). An additional bit is required in the DPR address to indicate which page, but this is easily incorporated. Another way of incorporating the DPR-page-identifier is by having another address bit for the assignment-ROM and include the DPR-page-identity as part of the ROM content.

The time-division-multiplexing scheme described above is appropriate when the super-frame structure of the DS1 is unimportant. That is, an octet received in a particular frame, say frame-N, within a DS1 can be reproduced at the far end within a DS1 in frame-M, where N and M do not have to be equal. When the traffic transported is clear channel, this is indeed true. When the traffic includes transmission of channel state using robbed-bit signaling, then payload octets in frames 6, 12, 18, and 24 are special; the least-significant bit is not data but a signaling bit (A/B/C/D).

In each sub-block interval of 125 μsec, each DS1 provides 24 octets; this implies that the 125 μsec can be split into 24 or even 32 parts, with 8 time-slices used for auxiliary purposes, with each time-slice being further split up into 4 sub-slices, one for each DS1. These time-slices can be numbered sl#0 through sl#23 and further subdivided as sl#0-0, sl#0-1, sl#0-2, and sl#0-3 to indicate the four sub-slices.

One approach to maintaining signaling-frame integrity is to ensure that a payload octet received in frame-N at the DS1 receiver is re-inserted into frame-N of the DS1 transmitter at the other end of the backhaul link. This condition or constraint is referred to as maintaining super-frame integrity. Maintaining super-frame integrity guarantees that signaling bit integrity is maintained. In the description below, it is assumed that the DS1 is ESF formatted, SF formatting being a subset of ESF.

The idea of an extended super-frame is based on an assembly of 24 frames corresponding to 3 msec in time. One G.shdsl frame is thus equivalent to two DS1 extended-super-frames. To maintain extended super-frame integrity, one DS1-extended-super-frame is associated with two G.shdsl-blocks. That is G.shdsl-block-0 and G.shdsl-block-1 together are associated with one DS1 extended super-frame. Likewise, G.shdsl-Block-2 and G.shdsl-block-3 together are associated with one DS1-extended-super-frame. There is still an association of G.shdsl-sub-blocks with DS1-frames, as shown below:
G.shdsl-Block-0 (sub-block-0)⇋DS-frame-0
G.shdsl-Block-0 (sub-block-1)⇋DS1-frame-1 . . .
G.shdsl-Block-0 (sub-block-11)⇋DS1-frame-11
G.shdsl-Block-1 (sub-block-0)⇋DS1-frame-12 . . .
G.shdsl-Block-1 (sub-block-11)⇋DS1-frame-23

In writing the above association, it has been assumed that the 24 DS1 frames of an extended-super-frame are numbered from 0 through 23, rather than the conventional 1 through 24, to maintain consistency of notation. Furthermore, G.shdsl-Block-2 and G.shdsl-Block-3 could be substituted for G.shdsl-Block-0 and G.shdsl-Block-1, respectively, since a G.shdsl frame contains 4 blocks, equivalent to 2 DS1-extended-super-frames.

The mapping from DS1 payload to G.shdsl payload thus follows the schemes described earlier with the additional constraint that the first DS1-frame within a DS1-extended-super-frame must be aligned with sub-block-0 of G.shdsl-Block-0 (Block-2). This alignment must be established in the implementation.

Figure 16:
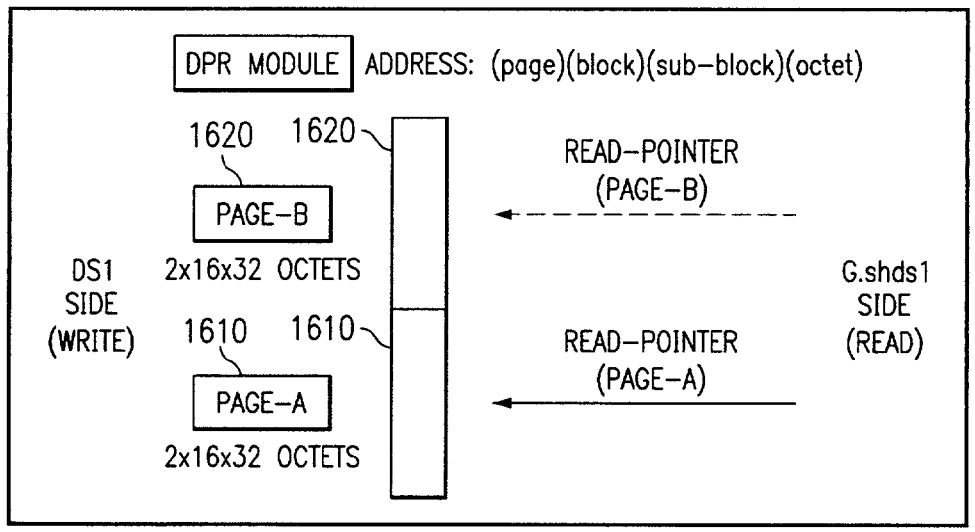
FIG. 16 illustrates a DPR module for preserving extended-super-frame integrity, representing an embodiment of the invention.

A suitable implementation is geared to the use of DPR modules. Earlier, referring to FIG. 16, it was assumed that the DPR module could be implemented with a capacity of two sub-blocks, referred to as Page-A 1610 and Page-B 1620. Having two pages avoids address contention by writing DS1 payload octets into one page while the G.shdsl transmitter was reading from the other page. By keeping the page capacity equivalent to one DS1-frame/G.shdsl-sub-block, frame-integrity was maintained. To maintain extended super-frame integrity, each page needs to be equivalent to two G.shdsl Blocks. Allowing for 32 octets per sub-block, the DPR module capacity becomes 2×2×12×32 octets, two pages; each page is 2 blocks; each block is 12 sub-blocks; each sub-block is 32 octets. To simplify the circuitry, the capacity may be chosen as $2 \times 2 \times 16 \times 32 = 2048 = 2^{11}$ octets (bytes) though a significant number of octets in memory may be unused. This situation is similar to reserving 32 octets for a sub-block and would leave a substantial number of unused memory locations if n is much less than 32.

The address used to access the DPR module can be broken down into sections. These sections correspond to page/block/sub-block. The read-address for the G.shdsl side sequences through the used memory locations. The sub-block part of the address follows the pattern $\{0, 1, \ldots, (n-1)\}$ {repeat}, where n is the number of octets per sub-block determined by the G.shdsl payload rate. The block part of the address follows the pattern $\{0, 1\}$ {repeat} and changes when the sub-block part increments from (n−1) to 0. The page part of the address follows the pattern $\{0, 1\}$ {repeat} and changes when the block part of the address increments from 1 to 0 (which is aligned with a sub-block increment from (n−1) to 0). The G.shdsl read operation is thus sequential.

The write operation, wherein DS1 payload octets are written into the DPR module, is related to but still different from the case described before. The difference arises because of the constraint of preserving extended-super-frame integrity. All DS1 framer chips provide a slip buffer (or effectively a frame buffer) that permits the DPR-write circuitry to obtain payload on a frame basis without requiring any particular alignment with the incoming DS1 frame epoch. That is, for practical purposes, the incoming DS1 frame is moved or shifted in time, to align with the master frame-synch that is actually tied to the G.shdsl frame synch. None of the DS1 framer chips available today provide a super-frame or extended-super-frame buffer to decouple the start-of-super-frame associated with writing to the DPR and the actual start-of-super-frame inherent in the incoming DS1. The incoming extended-super-frame alignment dictates the manner in which DS1 payload data is written into the DPR.

Figure 17:
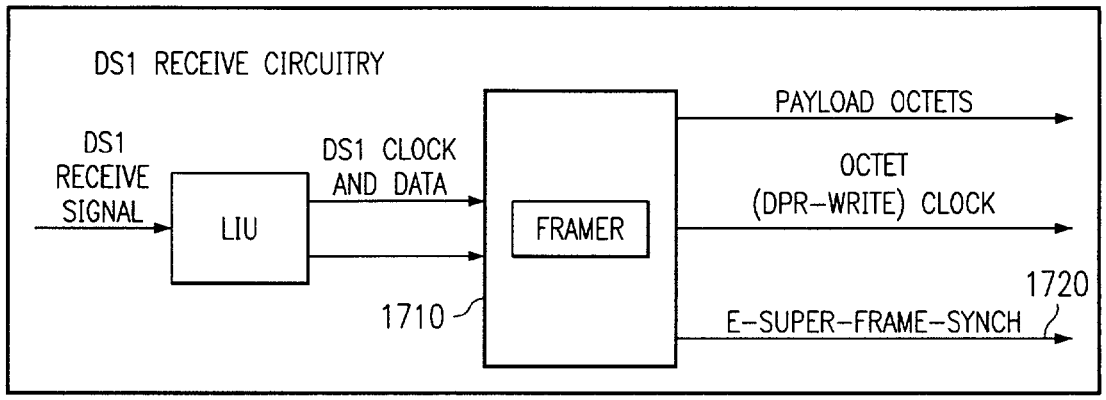
FIG. 17 illustrates a DS1 receive circuitry where framer provides (extended-)super-frame timing, representing an embodiment of the invention.

Referring to FIG. 17, consider the timing signals provided by a DS1 framer. The framer chip 1710 provides a timing signal 1720 indicating the start-of-(extended)-super-frame. Some additional circuitry is required to resolve timing contention between the 4 DS1 framers so that all do not try to access the DPR module(s) simultaneously.

Note that the derivation of write-address assignments is a simple extension of the methods described earlier. There a DS1 frame was mapped to a DPR-page where each DPR page was comprised of 125 μsec of payload. In the current situation, a DS1 extended-super-frame is mapped to a DPR-page and each DPR page is comprised of 3 msec of payload. This preserves extended-super-frame alignment as well as frame-alignment.

The key is to establish which page the DS1 payload must be written into. A straightforward algorithm for this can be if the start-of-(extended)-super-frame epoch occurs when the G.shdsl read-pointer is accessing Page-A, then the payload octets for the (extended)-super-frame are written into Page-B. Likewise, if the start-of-(extended)-super-frame epoch occurs when the G.shdsl Read-pointer is accessing Page-A, then the payload octets for the (extended)-super-frame are written into Page-B. Clearly, maintaining super-frame integrity is achievable by using a simple extension of the methodology described for achieving frame-integrity.

Earlier, a technique suitable for preserving super-frame integrity in a backhaul system was described. One of the underlying reasons for maintaining super-frame integrity is to preserve signaling bits. In many cases, it suffices that the signaling bits be transported along with the payload data and reinserted at the distant end. One drawback of reinserting signaling bits without preserving super-frame integrity is that the least significant bit of an octet may be altered. That is error-free user data can be supported only via the 7 most significant bits of each octet and this reduces the capacity of a DS0 from 64 kbps to 56 kbps. However, this is a common North American practice.

Associated with each channel are 4 signaling bits, A, B, C, D, for every extended super-frame. Thus, it is necessary to transport 96 bits, or 12 octets, every 3 msec to support all 24 channels of a DS1. If all 4 DS1s are supported, 48 octets of signaling bits must be transported every 3 msec.

This is easily accomplished by increasing the sub-block size by 1 octet. Every block (1.5 msec) of the G.shdsl frame then has the capability of transporting 12 additional octets and thus every pair of blocks (3 msec) can carry signaling bits for two DS1s. This additional octet per sub-block allows the carrying of all the signaling bits for all 96 channels (DS0s) of the 4 DS1s over 2 G.shdsl links. Alternatively, only 4 bits of the additional octet may be used for carrying signaling and in this case, signaling bits from DS1#k can be assigned to G.shdsl#k (k=0, 1, 2, 3) which makes case 1 (where only 3 G.shdsl links are used) moot. The advantage in using only 4 bits of the octet is that the other 4 bits become available for carrying other kinds of status information or even providing some error detection on the signaling bits. Considering that channel state errors are probably more catastrophic than random data errors, protecting the signaling bits is an attractive option.

Most DS1 framing chips provide the means to read the signaling bits associated with a DS0 concurrently with the DS0 data octet. This may seem inefficient since data octets potentially change every frame but signaling bits change every sixth frame. Actually, in ESF, each individual bit, A/B/C/D, can change no faster than every 24 frames. However, this apparent inefficiency is compensated for by the convenience of having the signaling bits made available often.

Figure 18:
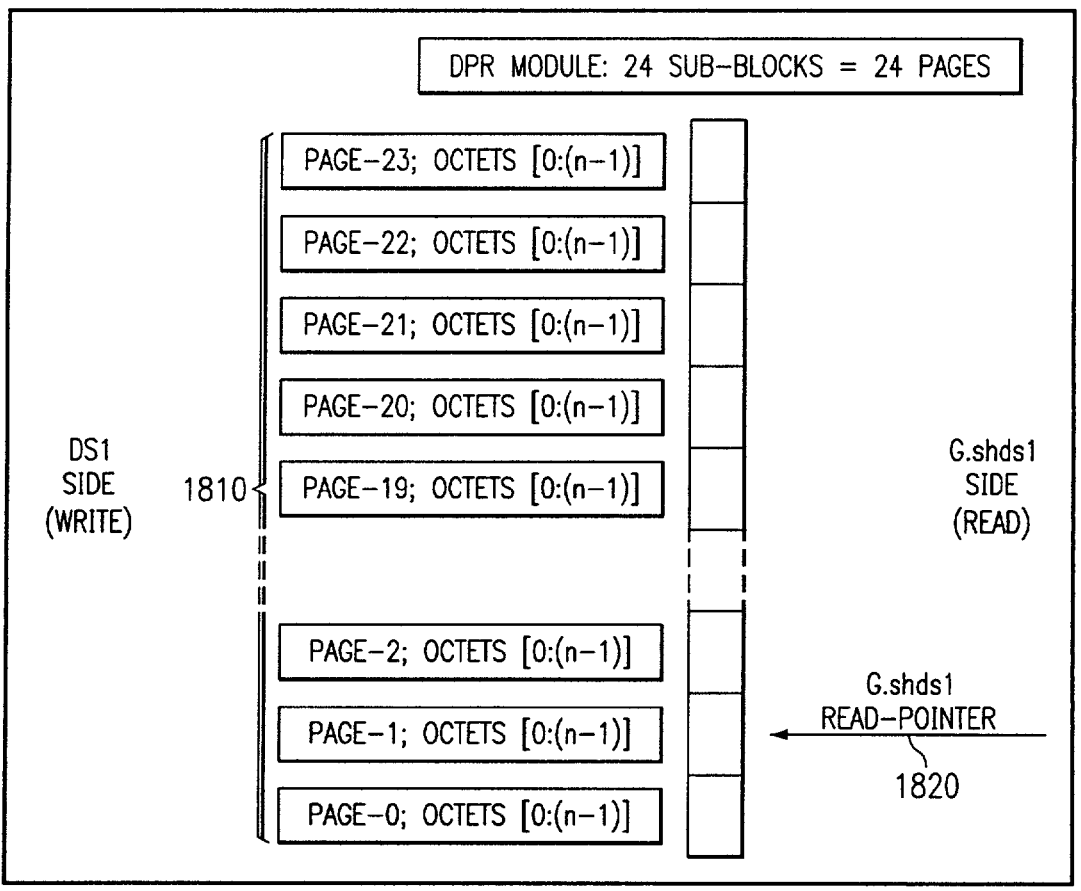
FIG. 18 illustrates a DPR module organized as 24 sub-blocks (DS1-frames) or 24 pages, representing an embodiment of the invention.

Referring to FIG. 18, in this situation, the structure of the DPR module takes the form shown. It is organized as 24 pages where each page 1810 is equivalent to a sub-block. The number of addressed octets in a sub-block is n, ranging in address from 0 through (n−1). The last address in a sub-block, namely address=(n−1), is reserved for signaling bits; the addresses from 0 through (n−2) are (n−1) octets for DS1 payload octets.

The G.shdsl read-pointer 1820 cycles through the 24 pages, at n octets per page. After page-23 is completely read, the pointer cycles to page-0. The G.shdsl read operation is sequential and treats the DPR module as a circular buffer. The G.shdsl frame boundary and reading page-0, octet-0 are time-aligned. The DS1 read-frame-synch is time-aligned with the G.shdsl frame boundary as well.

The DS1 payload octets are written in the page above the G.shdsl read-pointer. That is, if the G.shdsl read-pointer is accessing page-m, the DS1 payload octets are written into page-(m+1); if the G.shdsl read-pointer is accessing page-23, the DS1 payload octets are written into page-0. The DPR memory is treated as a circular buffer. This ensures that the octet sequence of the DS1 payload is preserved across the backhaul system. The signaling octets, which contain four DS1 signaling bits, on the other hand, are written in a random fashion across the entire DPR module. In particular, the signaling-octet for channel-m is written into octet#(n−1) of page-m, the last octet of the page.

Thus in each channel-interval (i.e. DS0 interval), as many as 8 write operations are performed, corresponding to a payload-octet, signaling-octet combination for each of the 4 DS1s. This can be achieved with a simple extension of the time-slice concept described earlier. These time-slices, and sub-slices can be identified by the notation sl#K-M-J. Here, K ranges from 0 through 23, corresponding to the 24 octets per DS1-frame; M ranges from 0 through 3 for the 4 DS1s, and J=0 for payload octet and J=1 for signaling octet. The implementation of the multiplexing scheme requires the creation of an address-mapping table, shown in Table 5.

Referring to Table 6, the equivalent of n=8 is presented. The necessary mapping for all other cases can be generated quite easily and are not provided here for the sake of brevity. Note that here n=9 as opposed to n=8, reflecting the fact that an additional octet per sub-block has been introduced for transporting signaling octets.

TABLE 6

Address assignments for Case 5 (n = 9)

| SI#K-M | M = 0 | | M = 1 | | M = 2 | | M = 3 | |
| --- | --- | --- | --- | --- | --- | --- | --- | --- |
| | J = 0 (payload) | J = 1 (signaling) | J = 0 (payload) | J = 1 (signaling) | J = 0 (payload) | J = 1 (signaling) | J = 0 (payload) | J = 1 (signaling) |
| K = 0 | DPR-0 (P)(O) | DPR-0 (0)(8) | DPR-3 (P)(0) | DPR-1 (0)(8) | null | null | null | null |
| K = 1 | DPR-0 (P)(1) | DPR-0 (1)(8) | DPR-3 (P)(1) | DPR-1 (1)(8) | null | null | null | null |
| K = 2 | DPR-0 (P)(2) | DPR-0 (2)(8) | DPR-3 (P)(2) | DPR-1 (2)(8) | null | null | null | null |
| K = 3 | DPR-0 (P)(3) | DPR-0 (3)(8) | DPR-3 (P)(3) | DPR-1 (3)(8) | null | null | null | null |
| K = 4 | DPR-0 (P)(4) | DPR-0 (4)(8) | DPR-3 (P)(4) | DPR-1 (4)(8) | null | null | null | null |
| K = 5 | DPR-0 (P)(5) | DPR-0 (5)(8) | DPR-3 (P)(5) | DPR-1 (5)(8) | null | null | null | null |
| K = 6 | DPR-0 (P)(6) | DPR-0 (6)(8) | DPR-3 (P)(6) | DPR-1 (6)(8) | null | null | null | null |
| K = 7 | DPR-0 (P)(7) | DPR-0 (7)(8) | DPR-3 (P)(7) | DPR-1 (7)(8) | null | null | null | null |
| K = 8 | DPR-1 (P)(0) | DPR-0 (8)(8) | null | | null | | null | |
| K = 9 | DPR-1 (P)(1) | DPR-0 (9)(8) | null | | null | | null | |
| K = 10 | DPR-1 (P)(2) | DPR-0 (10)(8) | null | | null | | null | |
| K = 11 | DPR-1 (P)(3) | DPR-0 (11)(8) | null | | null | | null | |
| K = 12 | DPR-1 (P)(4) | DPR-0 (12)(8) | null | | null | | null | |
| K = 13 | DPR-1 (P)(5) | DPR-0 (13)(8) | null | | null | | null | |
| K = 14 | DPR-1 (P)(6) | DPR-0 (14)(8) | null | | null | | null | |
| K = 15 | DPR-1 (P)(7) | DPR-0 (15)(8) | null | | null | | null | |
| K = 16 | DPR-2 (P)(0) | DPR-0 (16)(8) | null | | null | | null | |
| K = 17 | DPR-2 (P)(1) | DPR-0 (17)(8) | null | | null | | null | |
| K = 18 | DPR-2 (P)(2) | DPR-0 (18)(8) | null | | null | | null | |
| K = 19 | DPR-2 (P)(3) | DPR-0 (19)(8) | null | | null | | null | |
| K = 20 | DPR-2 (P)(4) | DPR-0 (20)(8) | null | | null | | null | |
| K = 21 | DPR-2 (P)(5) | DPR-0 (21)(8) | null | | null | | null | |
| K = 22 | DPR-2 (P)(6) | DPR-0 (22)(8) | null | | null | | null | |

TABLE 6-continued

Address assignments for Case 5 (n = 9)

| SI#K-M | M = 0 | | M = 1 | | M = 2 | | M = 3 | |
|---|---|---|---|---|---|---|---|---|
| | J = 0 (payload) | J = 1 (signaling) | J = 0 (payload) | J = 1 (signaling) | J = 0 (payload) | J = 1 (signaling) | J = 0 (payload) | J = 1 (signaling) |
| K = 23 | DPR-2 (P)(7) | DPR-0 (23)(8) | null | | null | | null | |
| K = 24, . . . ,31 | Null | | null | | null | | null | |

The interpretation of the address in Table 6 is as follows. First the DPR-k indicates which of the DPR modules the data is destined. There are 4 DPR modules, one for each G.shdsl. The notation (P)(x) refers to page-P and octet#x within that page. For the payload octets, the destination page is not absolute but depends on the G.shdsl read-pointer. For the signaling bits, the page identity is linked to the channel number, DS0 or octet number. The notion of null is that those DS0s are blocked because of lack of payload capacity in the G.shdsl links.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Practical Applications of the Invention

A practical application of the invention that has value within the technological arts is transporting legacy traffic, such as DS1 (T1), over (multiple) G.shdsl links. Further, the invention is useful in conjunction with digital subscriber loops, or in conjunction with ATM networks or the like.

There are virtually innumerable uses for the invention, all of which need not be detailed here.

Advantages of the Invention

Transporting legacy traffic, such as DS1 (T1), over multiple G.shdsl links, representing an embodiment of the invention, can be cost effective and advantageous for at least the following reasons. The invention permits DSL components, such as DSLMs, to be utilized without the need to install, or lease, expensive DSL interconnections between a DSL component and a control office. The invention improves quality and reduces costs compared to previous approaches.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all possible configurations. Further, although the apparatus for transporting legacy traffic over multiple G.shdsl links described herein can be a separate module, it will be manifest that the apparatus may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

Walter J. Goralski, Introduction to ATM Networking, McGraw-Hill Series on Computer Communications, 1995, ISBN 0-07-024043-4.

G.991.2 (ex G.shdsl), Single-Pair High-Speed Digital Subscriber Line (SHDSL) Transceivers, ITU-T (Draft) Recommendation, April 2000, [Formal release of G.991.2 is imminent].

PMC-Sierra Inc., Data Sheet for PM7347 S/UNI-JET and associated documentation including Application Notes.

Xilinx Inc., Documentation associated with Virtex-E Field Programmable Gate Arrays (FPGAs) currently available at www.xilinx.com.

Globespan, Inc., Product documentation for the Globespan line of G.shdsl chip-sets.

af-phy-0017.000, UTOPIA Specification Level 1, Version 2.01, The ATM Technical Forum, Mar. 21, 1994.

af-phy-0039.000, UTOPIA Specification Level 2, Version 1.0, The ATM Technical Forum, June 1995.

What is claimed is:

1. A method, comprising transporting digital data including:

coupling a first end of a plurality of unbundled network elements to a first modem;

coupling a second end of the plurality of unbundled network elements to a second modem;

applying a single signal to the first modem;

time division multiplexing the single signal into a plurality of signals at the first modem;

transmitting the plurality of signals to the second modem over the plurality of unbundled network elements;

receiving the plurality of signals at the second modem; and time division demultiplexing the plurality of signals to combine the plurality of signals into a single synchronous signal at the second modem, wherein the time division multiplexing includes:

dividing the plurality of signals into a set of data octets;

transmitting the set of data octets over a plurality of G.shdsl transceivers; and writing the data octets to a memory module, and wherein each of the plurality of unbundled network elements includes a G.shdsl link.

2. The method of claim 1, wherein the first modem provides bonding functionality.

3. The method of claim 1, wherein the second modem provides bonding functionality.

4. The method of claim 1, wherein transmitting includes synchronously transmitting.

5. The method of claim 1, wherein transmitting includes using a plurality of G.shdsl transceivers.

6. The method of claim 1, wherein the plurality of signals include framed signals.

7. The method of claim 1, wherein the set of data octets are grouped into sub-blocks.

8. The method of claim 1, wherein transmitting the set of data octets over the plurality of G.shdsl transceivers include utilizing as few of a plurality of G.shdsl links as possible.

9. The method of claim 8, wherein the plurality of G.shdsl links are operated at an identical payload rate.

10. The method of claim 9, wherein the identical payload rate is determined before applying the single signal.

11. The method of claim 8, wherein transmitting the set of data octets includes clear channel transmitting.

12. The method of claim 11, further comprising associating one dual-port RAM (DPR) frame with one G.shdsl block.

13. The method of claim 11, wherein transmitting the set of data octets includes writing the set of data octets into a dual-port RAM (DPR) module.

14. The method of claim 13, wherein writing the set of data includes non-sequential writing.

15. The method of claim 13, wherein transmitting the set of data octets includes the plurality of G.shdsl transceivers reading the set of data octets from the DPR module.

16. The method of claim 15, wherein reading the data includes sequential reading.

17. The method of claim 15, wherein reading the data octets includes reading-modifying-writing the set of data octets.

18. The method of claim 13, wherein the DPR module is divided into a Page A and a Page B.

19. The method of claim 18, wherein the Page A and the Page B are each equal to one G.shdsl block.

20. The method of claim 18, wherein writing the set of data octets includes:

writing the data octets in Page A when the plurality of G.shdsl transceivers is reading the data octets from Page B; and writing the data octets in Page B when the plurality of G.shdsl transceivers is reading the data octets from Page A.

21. The method of claim 18, wherein reading the set of data octets includes:

reading data octets for even-numbered sub-blocks from Page A; and reading data octets for odd-numbered sub-blocks from Page B.

22. The method of claim 1, wherein transmitting the set of data octets includes robbed-bit transmitting.

23. The method of claim 22, further comprising associating one dual-port RAM (DPR) extended-super-frame with two G.shdsl blocks.

24. The method of claim 22, wherein transmitting the set of data octets includes writing the set of data octets into a dual-port RAM (DPR) module.

25. The method of claim 24, wherein writing the data includes sequential writing.

26. The method of claim 24, wherein transmitting the set of data octets includes the G.shdsl transmitter reading the set of data octets from the DPR module.

27. The method of claim 26, wherein reading the data includes sequential reading.

28. The method of claim 26, wherein reading the data octets includes reading-modifying-writing the data octets.

29. The method of claim 24, wherein the DPR module is divided into a Page A and a Page B.

30. The method of claim 29, wherein the Page A and the Page B are each equal to two G.shdsl blocks.

31. The method of claim 24, wherein writing the set of data octets includes:

writing the data octets in Page A when the plurality of G.shdsl transceivers is reading data octets from Page B; and writing the data octets in Page B when the plurality of G.shdsl transceivers is reading data octets from Page A.

32. The method of claim 1, wherein transmitting the set of data octets includes transporting signaling bits without altering the least significant bit by increasing the sub-block size of a G.shdsl frame by 1 octet.

33. The method of claim 32, wherein transmitting the set of data octets includes writing the data octets into a dual-port RAM (DPR) module.

34. The method of claim 33, wherein transmitting the data octets includes the G.shdsl transmitter reading the data octets from the DPR module.

35. The method of claim 33, wherein writing the data octets further comprises writing a payload octet into a page (m+1) when a page m is being read.

36. The method of claim 35, wherein m is an integer.

37. The method of claim 35, wherein, when a max value of m is reached, then a value of (m+1) is set equal to 0.

* * * * *